United States Patent
Fleck et al.

[11] 3,784,225
[45] Jan. 8, 1974

[54] OCCUPANT RESTRAINT SYSTEM
[75] Inventors: Lawrence L. Fleck, Warren; Robert Hickling, Royal Oak, both of Mich.
[73] Assignee: General Motors Corporation, Detroit, Mich.
[22] Filed: Oct. 2, 1972
[21] Appl. No.: 294,151

[52] U.S. Cl............................ 280/150 AB, 182/137
[51] Int. Cl. ............................................. B60r 21/08
[58] Field of Search ............... 280/150 AB; 182/137

[56] References Cited
UNITED STATES PATENTS

| | | | |
|---|---|---|---|
| 3,675,942 | 7/1972 | Huber | 280/150 AB |
| 3,733,091 | 5/1973 | Fleck et al | 280/150 AB |
| 3,610,657 | 10/1971 | Cole | 280/150 AB |
| 3,702,706 | 11/1972 | Sobkow | 280/150 AB |

Primary Examiner—Kenneth H. Betts
Assistant Examiner—John P. Silverstrim
Attorney—W. E. Finken et al.

[57] ABSTRACT

An occupant restraint system for an automotive vehicle includes a cylindrical lower inflatable cushion mounted on the instrument panel of the vehicle and communicating with an inflator. The inflated lower cushion functions as a knee cushion when engaged with the knees of a seated vehicle occupant. An upper inflatable cushion includes a plurality of side-by-side interconnected fluid passageways looped to the lower cushion and having their ends opening to the lower cushion so as to be inflated by pressure fluid received therefrom. The upper cushion is provided with end walls having openings to the interior thereof. These openings are each provided with sleeve type valves permitting the induction of ambient atmosphere into the upper cushion when the fluid passageways of the upper cushion are inflated. The end walls also include openings covered by porous material to permit the expulsion of the ambient atmosphere from within the upper cushion upon engagement with the torso of the seated occupant. The upper cushion is normally folded adjacent the lower cushion. When the lower cushion is inflated, it initially functions as a deployment cushion as it moves the upper cushion outwardly from the instrument panel. The lower cushion then inflates the fluid passageways of the upper cushion as the upper cushion is inflated to induct ambient atmosphere into the upper cushion and complete the inflation thereof.

3 Claims, 5 Drawing Figures

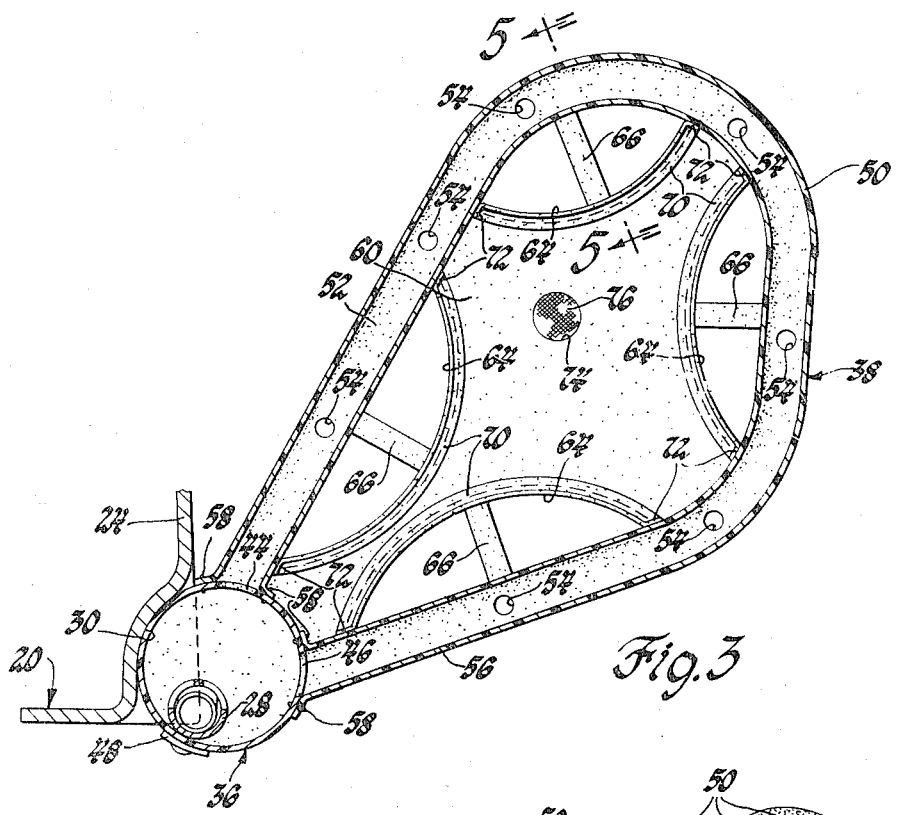
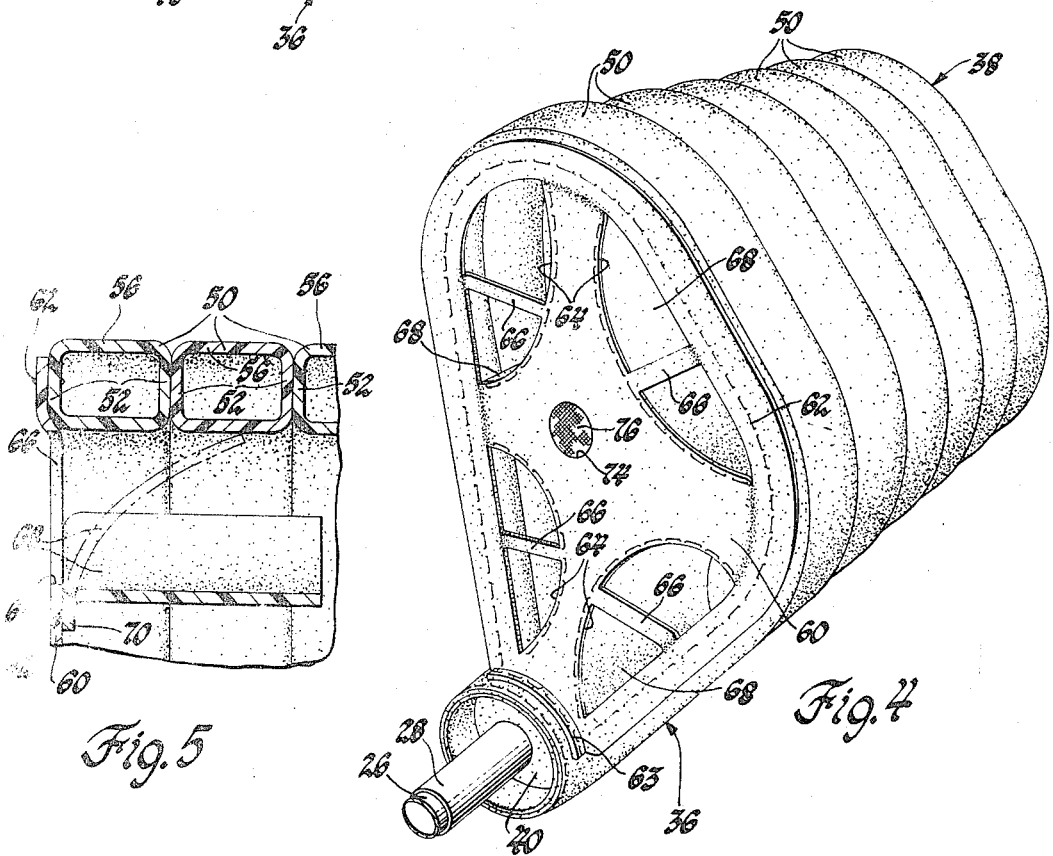

OCCUPANT RESTRAINT SYSTEM

This invention relates generally to occupant restraint systems for automotive vehicles and more particularly to such a system which includes knee and torso cushions inflated both by pressure fluid and by ambient atmosphere.

The system of this invention generally includes a first inflatable cushion of generally cylindrical shape which is mounted on the instrument panel of the vehicle and is inflated from a pressure fluid source so as to provide a knee cushion for a seated vehicle occupant. A second cushion includes a plurality of fluid passageways looped to the first cushion and inflated from the first cushion as the first cushion is inflated. The second cushion, when inflated, provides a torso cushion for the seated occupant. The interior of the second cushion defined by the passageways is closed by end walls which include both induction type valves and eduction type valves, the former permitting the induction of ambient atmoshpere into the interior of the second cushion when the fluid passageways are being inflated from the first cushion, and the latter permitting the expulsion of the ambient atmosphere from the interior of the second cushion when the occupant engages the second cushion. Normally the second cushion is stored in a folded condition adjacent the first cushion. When the first cushion is inflated, it functions as a deployment cushion to move the second cushion outwardly of the instrument panel to a partially deployed position. Additionally, the first cushion functions as a knee cushion upon occupant engagement therewith.

One of the problems with induction type cushions is that of inflation time. Such cushions include an inflatable first portion which must be inflated from a pressure fluid source before ambient atmosphere can be inducted into a second inflatable portion of the cushion. By moving the second cushion outwardly from the instrument panel through the use of the first cushion, the unfolding of the second cushion is initiated earlier than if the first cushion were not present and thus the inflation time of the second cushion can be reduced. Additionally, the pressure fluid does not flow directly into the second cushion so that the second cushion is deployed with less force.

It is therefore the primary object of this invention to provide an occupant restraint system for automotive vehicles which includes an inflatable first cushion functioning as both a deployment cushion for an inflatable second cushion and as a knee cushion when engaged by a seated vehicle occupant. Another object of this invention is to provide such a system wherein the second cushion is inflated by pressure fluid received from the first cushion and also by the ambient atmosphere inducted into the second cushion. It is a further object of this invention to provide such a system wherein the second cushion functions as a torso cushion and can expel induced ambient atmosphere when engaged by the torso of the occupant.

These and other objects of the invention will be readily apparent from the following specification and drawings wherein:

FIG. 3 is a sectional view taken generally along the plane indicated by line 3—3 of FIG. 2;

FIG. 4 is a perspective view of a portion of FIG. 1; and

FIG. 5 is a sectional view taken generally along the plane indicated by line 5—5 of FIG. 3.

Figure 1:
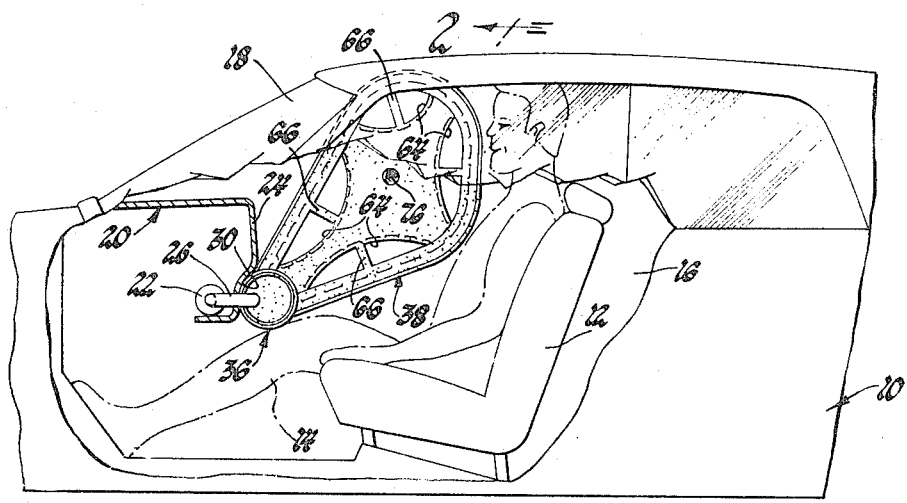
FIG. 1 is a partially broken away partial view of an automotive vehicle embodying an occupant restraint system according to this invention with the knee and torso cushions of the system being shown in inflated or deployed position with respect to a seated vehicle occupant.
Figure 2:
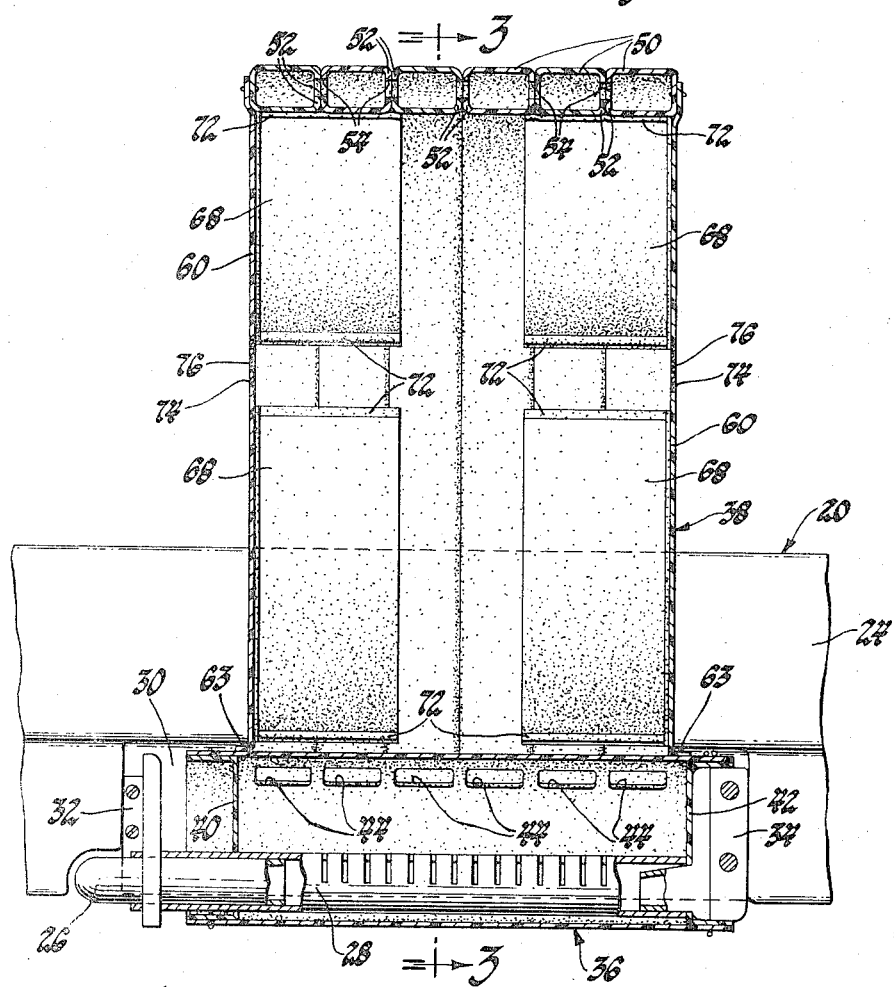
FIG. 2 is an enlarged broken away view taken generally along the plane indicated by line 2—2 of FIG. 1.

Referring now particularly to FIG. 1 of the drawings, an automotive vehicle designated generally 10 includes a front seat 12 which supports a schematically indicated seated occupant 14. The vehicle 10 additionally includes an occupant compartment 16 which is defined in part by a conventional windshield 18 and a conventional instrument panel 20. An inflator 22 of known type, such as a gas generator, is mounted on the instrument panel 20 rearwardly of a wall 24 thereof and is conventionally connected to a suitable sensor which senses either impacts received by the vehicle or changes in velocity of the vehicle which occur as a result of such impacts. The inflator 22 communicates with a manifold 26 which in turn is secured to and communicates with a slotted type diffuser 28. The diffuser 28 fits within a recess 30 of the wall 24 and generally extends between the side walls thereof. As shown in FIG. 2, suitable left- and right-hand conventional brackets 32 and 34 are secured to the base wall of the recess and both mount and locate the diffuser 28 within the recess. The right-hand bracket additionally closes the right-hand end of the diffuser.

With reference now to the remaining figures of the drawing, the system of this invention includes an inflatable knee or first cushion 36 of generally cylindrical shape and an inflatable torso or second cushion 38 of generally teardrop shape which extends from the knee cushion. The knee cushion 36 receives the diffuser 28 therein as shown in FIGS. 2 and 3 to communicate the cushion and the inflator 22. The end walls 40 and 42 of the knee cushion are apertured to respectively receive the diffuser and the plug end of bracet 34. The cushion 36 may be made of any suitable fabric, such as neoprene coated nylon. The end walls 40 and 42 are conventionally stitched to the body of the cushion. As shown in FIG. 3, the body of the knee cushion includes two axial rows 44 and 46 of generally rectangular openings. The body of the cushion is conventionally secured to the diffuser 28 by a bracket 48, FIG. 3, and sheet metal screws, to locate the rows 46 and 48 with respect to respective rows of slots of the diffuser.

From FIGS. 2 and 3, it can be seen that upon communication of the inflator 22 with the diffuser 28 through the manifold 26, the knee cushion 36 will be inflated from its normally stored folded position around the diffuser 28 to its inflated or deployed position, FIG. 1, with respect to the recess 30.

The cushion 38, as shown in FIG. 2, includes a plurality of like side-by-side inflatable fluid passageways 50 of generally rectangular cross section. Abutting juxtaposed end walls 52 of the passageways are adhesively secured to each other and the resulting double thickness common walls include a plurality of openings 54 so that the passageways 50 cross communicate with each other. The outer side walls 56 of the abutting passageways are stitched at 58 to the body of cushion 36 around a respective pair of openings 44 and 46 as shown in FIG. 3 so that each passageway is individually inflated from the cushion 36 when this cushion is inflated by the pressue fluid from the inflator 22. The openings 54 are aligned transversely of the cushion 38. Thus, in addition to each passageway having its own individual inlets from the cushion 36, the passageways additionally cross communicate with each other transversely of the cushion.

The terminal passageways 50 are each provided with a like end wall 60 as shown in FIG. 3 to enclose the interior of the cushion 38. Each end wall 60 is stitched at 62 to the free end wall of a terminal passageway and stitched at 63 to the body of cushion 36. Each wall 60 includes a number of semicircular cutouts which define induction openings 64 to the interior of cushion 38. A strap 66 spans each induction opening.

As best shown in FIGS. 4 and 5, a flexible sleeve type valve 68 of nonporous material is provided for each of the openings 64. Each valve has an end flange 70 stitched to the end wall 60 adjacent the inner edges of openings 64 and a pair of side flanges 72, FIG. 2, adhesively secured to the inner walls of a number of the fluid passageways 50. The sleeve-type valves cooperate with the inner walls of passageways 50 and their respective openings 64 to define induction passages to the interior of the cushion 38 from the opposite ends thereof. It will be noted with reference to FIG. 5 that the outer edges of the openings 64 are generally coterminous with the inner wall of the terminal fluid passageway 50. When the valves 68 are in their position shown in full lines in FIG. 5, it can be seen that ambient atmosphere can freely flow from the exterior of the cusion 38 to the interior thereof. However, when the valves are in their dash line position shown in FIG. 5, wherein the valves seat against the inner walls of passageways 50, it can be seen that the induction passages are closed and that flow from the interior of the cushion 38 to the exterior thereof is blocked. The straps 66 prevent blowout of the valves through the openings 64.

With reference to FIGS. 3 and 4, each end wall 60 is further provided with a circular opening 74 which is closed by a porous fabric membrane 76 adhesively secured to the wall 60 around the opening 74. The openings 74 function to permit the expulsion of ambient air from within the cushion 38 when the induction passages are closed.

Normally the cushions 36 and 38 are stored in a folded condition within the recess 30 and around the diffuser 28. Any suitable type of rupturable cover may be provided for the recess as is known.

When the inflator 22 is actuated by the sensor, the pressure fluid generated by the inflator will flow through the manifold 26 and into the slotted diffuser 28 to initiate inflation of the knee cushion 36. As the knee cushion initially inflates, it will move the folded torso cushion 38 outwardly from within the recess 30 to initiate the deployment of the torso cushion. Upon continued inflation of the knee cushion, the pressure fluid from the knee cushion will flow through the openings 44 and 46 to the respective passageways 50 to thereby inflate these passageways and continue deployment of the cushion 38. As the fluid passageways become inflated, ambient atmosphere will be inducted into the interior of the cushion 38 through the induction passages provided by the openings 64, the valves 68 and the inner walls of the passageways 50.

The cushions 36 and 38 are thus deployed to their position shown in FIG. 1. It can be seen that the cushion 36 is positioned for engagement with the knees of the occupant 14 and that the cushion 38 is positioned for engagement with the torso of such occupant. When the occupant's torso engages the cushion 38, the increase in pressure within the interior of the cushion 38 will move the valves 68 to their closed position indicated in dash lines in FIG. 5 so that the ambient atmosphere remains trapped within the cushion. The ambient atmosphere can be expelled through the openings 74, however, to limit rebound of the occupant upon engagement with the cushion 38. It will be noted that the cushions 36 and 38 are always in communication with each other through the openings 44 and 46 and likewise that the fluid passageways 50 are always in communication with each other through the openings 54. However, only the ambient atmosphere inducted into the cushion 38 can be expelled upon occupant engagement with this cushion.

From the foregoing description, it can be seen that the cushion 36 functions both as a knee cushion and as a deployment cushion. By moving the cushion 38 outwardly of the recess 30 and initiating deployment thereof, the cushion 36 reduces the inflation time of the cushion 38 and thereby ensures that both cushions are inflated within the allotted time budget.

Although not shown in the drawings, it will be noted that the fluid passageways 50 can each be tapered relative to one another so that the apical portion of the cushion will remain as shown in FIG. 2 but the basal portion of the cushion will be wider so that the cushion can accommodate two front seat passengers, if desired.

Thus, this invention provides an improved occupant restraint system.

We claim:

1. In combination with a vehicle body having a source of pressure fluid and adapted to support an occupant in seated attitude, an occupant restraint system comprising, an inflatable knee cushion mounted on the body for engagement with the knees of the occupant when inflated, means communicating the knee cushion with the pressure fluid source, an inflatable torso cushion mounted on the first cushion and including an exterior portion communicating with the first cushion for inflation by pressure fluid therefrom, and an interior portion communicating with ambient atmosphere, first means permitting only the induction of ambient atmosphere into the interior portion upon inflation of the exterior portion from the knee cushion, and second means permitting the expulsion of ambient atmosphere from the interior portion upon engagement of the torso of an occupant with the exterior portion.

2. In combination with a vehicle body having a source of pressure fluid and adapted to support an occupant in seated attitude, an occupant restraint system comprising, an inflatable knee cushion mounted on the body for engagement with the knees of the occupant when inflated, means communicating the knee cushion with the pressure fluid source, an inflatable torso cushion including a plurality of side-by-side fluid passageways looped to the knee cushion, means communicating the fluid passageways with the knee cushion for inflation thereof from the knee cushion, means cooperating with the fluid passageways to define an interior ambient atmosphere receiving chamber within the torso cushion, means permitting the induction of ambient atmosphere into the chamber upon inflation of the fluid passageways from the knee cushion, and means permitting the expulsion of ambient atmosphere from within the chamber upon occupant engagement with the torso cushion.

3. In combination with a vehicle body having a source of pressure fluid and adapted to support an occupant in seated attitude, an occupant restraint system comprising, an inflatable knee cushion of annular shape mounted on the body for engagement with the knees of the occupant when inflated, means communicating the knee cushion with the pressure fluid source, an inflatable torso cushion including a plurality of side-by-side passageways having the ends thereof opening to the knee cushion for inflation from the knee cushion and deployment to generally teardrop shape, the passageways and knee cushion cooperatively defining an interior chamber within the torso cushion open at the ends thereof to ambient atmosphere, wall means closing the ends of the chamber, means in said wall means permitting the induction of ambient atmosphere into the chamber upon deployment of the passageways from the knee cushion, and means permitting the expulsion of ambient atmosphere from the chamber upon occupant engagement with the passageways.

* * * * *